Patented Dec. 19, 1950

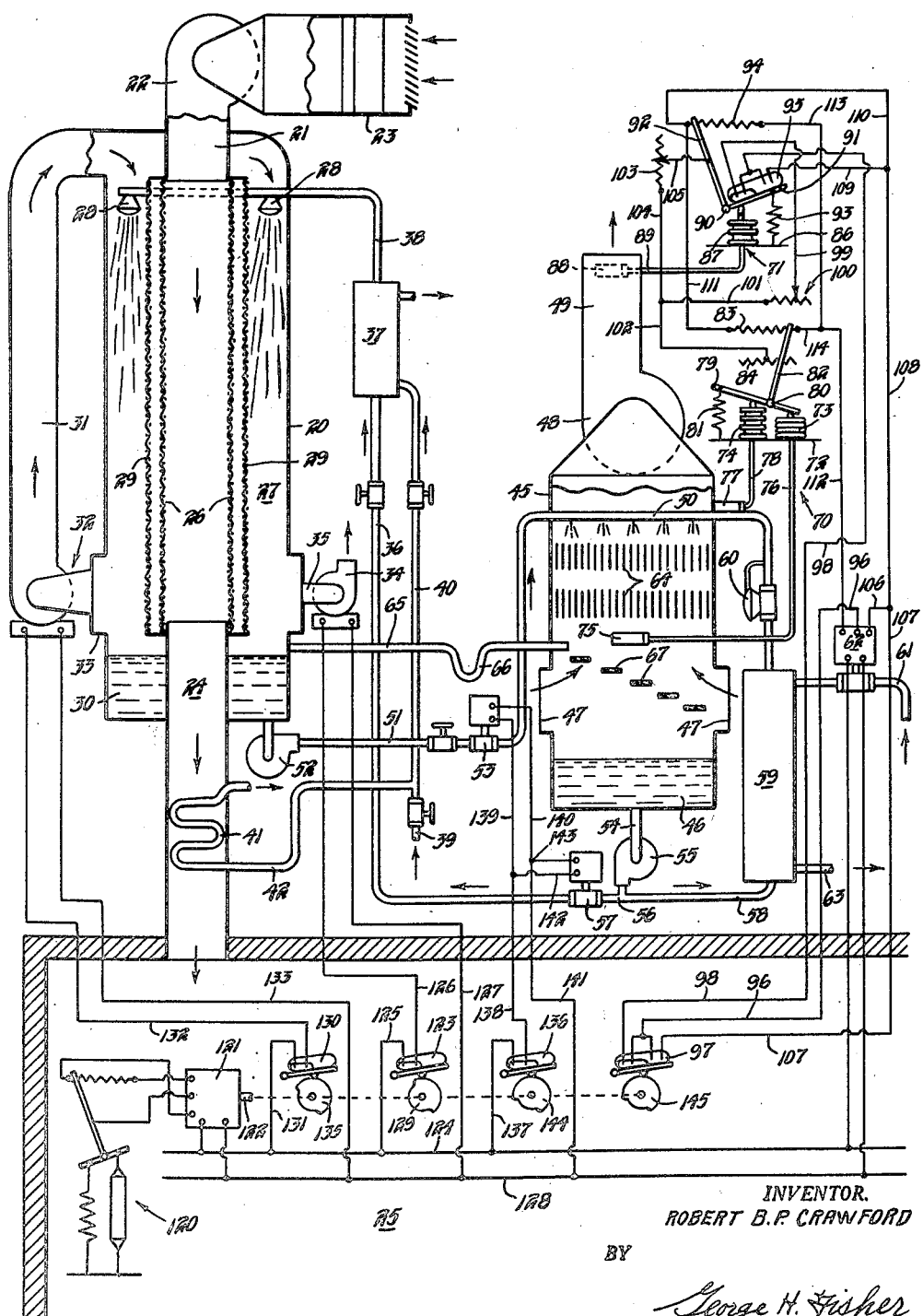

2,535,008

UNITED STATES PATENT OFFICE 2,535,008

SOLUTION CONCENTRATING APPARATUS

Robert B. P. Crawford, Kansas City, Mo.

Original application February 13, 1943, Serial No. 475,777. Divided and this application January 5, 1946, Serial No. 639,388

6 Claims. (Cl. 159—4)

One of the principal ways of dehumidifying air comprises passing the air through a spray of a suitable solution, such as a brine. The brine absorbs water vapor from the air and becomes weakened thereby hence it is necessary to either provide a fresh solution periodically or to reconcentrate the weakened solution so that it can be used again.

Since the brine in absorbing the water vapor becomes weaker or less concentrated, some means must be provided for supplying concentrated brine solution to the apparatus. From an economical standpoint this means that the weak solution should be concentrated and this may be done in any of the now well known manners although I provide herein, as will be later explained, a new type of chemical solution concentrator which not only has utility within itself for use in other systems of dehumidifying air but is also particularly usable in connection with my present dehumidifying apparatus, as described and claimed in my application Serial No. 475,777, filed February 13, 1943, and now Patent Number 2,433,741, of which the present application is a division.

It is therefore an object to provide an improved solution concentrator of general utility, but of especial value for handling solutions used in dehydrating air because of its high capacity and economical operation.

It is an additional object to provide a solution concentrator having sprays wherein the pressure applied to the sprays is kept constant even though the supply of solution to be concentrated may vary.

Another object of my invention is the provision of a new brine concentration apparatus and means for controlling the same.

More specifically, it is an object of my invention to control the heating of a solution which is placed in intimate contact with air in a concentrating chamber by the temperature of the solution before and after it contacts such air and by the temperature of the air after it leaves the solution, particularly where the solution and air flow in counter-current relationship to each other.

It is a further object of my invention to control the heating of brine to be concentrated in such manner as to maintain a predetermined differential in the temperature of the brine before and after it contacts a stream of air and to vary such temperature differential by the temperature of the air after it has been contacted by the brine.

It is also an object to provide a solution concentrator wherein solution to be concentrated is heated and sprayed into an air stream, the heating being controlled in response to the temperatures of the solution before and after it is sprayed into said air.

Other objects and advantages of my invention will become clear from a study of the following detailed description in connection with the accompanying drawing, in which:

The single figure of the drawing shows a schematic view of the present apparatus in combination with a preferred form of dehumidifying apparatus, including the control means for the entire apparatus.

Referring again to the drawing, a vertical dehumidifying chamber 20, which may be cylindrical in form, is provided with an air inlet pipe 21 which is supplied with the air to be dehumidified by a fan 22 which takes air from any suitable source, as for example the outdoors or from the return of an air conditioning system, through a duct 23. The dehumidifying chamber 20 is further provided with an outlet pipe 24 which connects with a room or space 25 to be conditioned. The outlet pipe 24 extends upwardly into the dehumidifying chamber 20 and is axially aligned with the inlet pipe 21. A molecular filter, which takes the form of a cylindrical fine mesh screen or semi-permeable membrane, joins the inlet pipe 21 and the outlet pipe 24 so that there is a continuous passage through the dehumidifying chamber 20 within which passage the air to be dehumidified is constrained. The space 27 between the dehumidifying chamber 20 and the membrane filter 26 comprises a spray chamber into which the brine solution is sprayed by means of sprays 28 located near the top of the dehumidifying chamber 20. If desired, a further relatively coarse screen, cylindrical in form, may surround but be spaced from the molecular filter 26 as shown at 29. This further screen 29 has a somewhat larger mesh and may be omitted although it helps to keep the brine from contacting the outside of the molecular filter 26. The sprayed brine collects in the bottom of the dehumidifying chamber 20 in a sump 30.

In order to provide greater efficiency, the mist formed by some of the sprayed brine solution and the air in the spray chamber 27 may be recirculated at high velocity by means of a by-pass or recirculating pipe 31 having its upper end connected to the top of the dehumidifying chamber and its lower end connected to an electrically operated fan 32, the intake of which is connected to a bustle 33 formed in the lower portion of the dehumidifying chamber 20. Also, in order to create a pressure differential between the air to be dehumidified and the brine in the spray chamber 27, or to increase the pressure differential therebetween, an electrically operated vacuum producing pump 34 is connected to the opposite side of bustle 33 by a pipe 35.

Concentrated brine for the sprays 28 may be obtained from any suitable source and supplied to a pipe 36 which preferably then goes through a brine precooler 37 after which the strong brine solution passes to the sprays 28 by means of a pipe 38. Cooling water for the brine cooler 37 may be obtained from any suitable source and is supplied thereto by pipes 39 and 40. Also, in order to reduce the temperature of the dehumidified air, a cooling coil 41 may be located in the air passage 24 and supplied with cooling water from the same source by means of a pipe 42 which connects to the pipe 40.

With this much of the system described and assuming that the air circulating fan 22, the recirculating fan 32, and the vacuum producing means 34 are all in operation, and further assuming that there is a source of strong brine solution which is being supplied to the pipe 36 and therefore to the sprays 28, the apparatus operates in the following manner. Air is taken in by means of duct 23 from the outside or from the return line of an air conditioning system and is caused to pass through the passage formed by the inlet duct 21, the membrane filter 26 and the outlet pipe 24. The dehumidified air then passes over the cooling coil 41 and is delivered into the room or space 25. This air at 23 will have a vapor pressure of, say 23 millimeters, as it enters the top of the dehumidifying chamber 20. The vapor pressure of the brine solution, in accordance with the foregoing example, would be around one or two millimeters. The vacuum producing means 34 can of course be adjusted as desired and if adjusted so as to produce a vacuum of about 50 millimeters there will be a total differential of about 71 millimeters between the vapor pressure of the air entering the dehumidifying chamber 20 and the vapor pressure of the sprayed brine as well as the recirculated brine mist in the spray chamber 27. As a result, the water molecules, or some of them, will pass through the filter 26 and into the spray chamber 27. However, the air molecules will not pass therethrough, or very few of them in relation to the total number of air molecules. As a result, moisture will be removed from the air and as this air reaches the lower portion of the dehumidifying chamber 20 sufficient moisture may be removed so that the vapor pressure of the air is now only 5 millimeters. The pressure differential may be thus reduced to 55 millimeters. This still, however, is a relatively large pressure differential with the result that water molecules will be continuously removed from the air as it passes down through the dehumidifying chamber 20. It is noted that this is accomplished without there being any actual contact between the air and the brine. The relatively rapid recirculation of the brine mist by means of the recirculating fan 32 and recirculating passage 31 will further increase the efficiency of the apparatus by reducing brine film through which water vapor molecules must pass to be absorbed. Further, the relatively coarse screen 29 together with the vacuum produced by the vacuum producing means 34 tends to keep the sprayed brine and brine mist from having intimate contact with the outside of the molecular filter 26 and this further increases the rate at which the water molecules pass through the molecular filter 26. In this manner, water is removed from the air to be dehumidified at a rapid rate and therefore the size and proportionate cost of the equipment is relatively low. All this is accomplished without there being any entrainment of the brine with the air being dehumidified and with a great reduction, if not an entire, elimination of corrosion. It should also be noted that since the brine does not come into contact with the air being dehumidified and since there is no entrainment of the brine in such air, it is therefore possible to use inexpensive brines having the desired characteristics, which brines might well be unsuitable in other types of systems where entrainment would take place, since such brines might well contaminate the air and be dangerous to health or furnishings of the space to which the dehumidified air is delivered.

As stated above, the concentrated brine solution supplied to pipe 36 may be taken from any suitable source of supply but I prefer to use a particular type of brine concentrating means and control apparatus which controls both the brine concentrating means and the dehumidifying means. To the right of the dehumidifying chamber 20 is a brine concentrator comprising a concentrating chamber 45 having a sump 46 at its bottom and air inlets 47 above the sump 46. The top of the brine concentrating chamber 45 is connected to a fan 48 which pulls air into the brine concentrating chamber 45 by way of the air inlet openings 47 and discharges it through a discharge pipe 49. Any suitable source of air may be used but preferably this air is taken from outdoors and is discharged to the outdoors. Located near the top of the brine concentrating chamber 45 is a brine spray 50 in the form of a pipe having sprays attached thereto. The weak brine solution gathered in the sump 30 of the dehumidifying chamber 20 is supplied to the left-hand end of the brine spray 50 by means of a pipe 51. Included in the pipe 51 is a pump 52 for pumping the weak brine solution from the sump 30 to the sprays 50. The pipe 51 additionally includes an electrically operated on and off valve 53, which may for example be of the solenoid type, the purpose of which will be explained hereinafter.

An outlet pipe 54 connects to the bottom of the sump 46 of the brine concentrator and leads to a pump 55. Part of the discharge from the pump leads to the sprays 28 of the dehumidifying chamber 20 by way of the pipe 36 and a pipe 56, there being an on and off electrically operated valve 57 of the solenoid type between these two pipes. Additionally, part of the discharge from the pump 55 is recirculated back to the sprays 50 by means of a pipe 58 which is associated with a heat exchanger 59. Also located in the pipe 58 between the heat exchanger 59 and the spray 50 is a pressure responsive valve 60 which so controls the flow of brine through the pipe 58 so as to maintain a substantially constant pressure on the sprays 50. The heat exchanger 59 is heated in any suitable manner, for example, by steam which is supplied thereto by a pipe 61 through an electrically operated modulating valve 62 and is discharged therefrom by a pipe 63.

Also located within the brine concentrating chamber 45 are contact surfaces 64 over which the brine runs. This is for the purpose of obtaining more intimate contact between the brine which flows downwardly and the air which flows upwardly. Additionally, an overflow pipe 65 interconnects the top of the sump 30 of the dehumidifying chamber 20 with the brine concentrating chamber 45 so that if too much weak solution gathers in the sump 30, the overflow may flow into the brine concentrator 45. In order to prevent breaking of the vacuum in the dehumidifying chamber 20, the overflow pipe 65 is provided with a trap of any suitable form, herein shown as an ordinary goose neck 66. Also located in the brine concentrating chamber 45 is a series of baffle plates 67 down which the overflowing brine trickles.

The modulating steam valve 62 is controlled by a differential temperature controller generally indicated at 70, the differential temperature at which such controller controls being in turn adjusted by a temperature controller 71 which responds to the temperature of the air being discharged from the brine concentrator.

The differential controller 70 comprises a supporting base 72 which supports a pair of bellows 73 and 74. The bellows 73 is connected to a bulb 75 by a tube 76, as is well known, and the bulb 75 is located below the plates 64 so as to respond to the temperature of the brine leaving such plates. The bellows 74 is connected to a bulb 77 by a tube 78. The bulb 77 responds to the temperature of the solution entering the sprays 50 and is shown mounted in intimate contact with the spray pipe 50. These two bellows cooperate with an arm 79 pivoted at 80 at a point intermediate the two bellows and biased to rotate in a counter-clockwise direction by a spring 81 having one of its ends secured to the left-hand end of arm 79 and its other end secured to the supporting base 72. Extending at right angles from the arm 79 is a slider arm 82 which cooperates with a controlling resistance 83 and additionally cooperates with a corrector resistance 84.

The temperature responsive controller 71 includes a supporting base 86 that supports a bellows 87 connected to a bulb 88 by a tube 89. As stated above, the bulb 88 responds to the temperature of the air leaving the brine concentrator and is herein shown as being located in the discharge pipe 49. The bellows 87 operates a bellcrank pivoted at 90 and having a generally laterally extending arm 91 and a generally vertical extending arm 92 which comprises a contact arm. The arm 91 is biased so as to rotate the bellcrank in a clockwise direction about its pivot 90 by means of a spring 93 having one end secured to the right-hand end of arm 91 and its other end secured to the supporting base 86. The contact arm 92 cooperates with a compensating resistance 94. The arm 91 supports a mercury switch of the doubled ended or double circuit type 95. The relationship of the parts is so arranged that the electrodes in the left-hand end of mercury switch 95 are closed for all positions of the contact arm 92 except when the contact arm 92 engages the extreme right-hand end of compensating resistance 94.

The electrical modulating motor 62 has the usual three control wires, one of which is a common wire 96. This common wire 96 leads to the common electrodes of a doubled ended mercury switch 97 which is operated in a manner that will be described hereinafter. Normally, when the system is in operation, the circuit is closed through the left-hand end of mercury switch 97 so that common wire 96 is connected to a further branch 98 of the common wire. This wire 98 leads to the common electrodes of the mercury switch 95 and a wire 99 leads from the other left-hand electrode of the mercury switch 95 and therefore constitutes a further extension of the common wire. Wire 99 connects to an adjusting rheostat 100 and the resistance of such rheostat is connected to the middle of the corrector resistance 84 by wires 101 and 102. It is further connected to the resistance of a rheostat 103 by wires 101 and 104. The contact of rheostat 103 is connected to the contact arm 92 by a wire 105.

The electrically operated valve 62 additionally includes a valve controlling wire 106 that has a branch 107 connecting to the right-hand terminal of mercury switch 97. It has a further branch 108 which similarly connects to the right-hand terminal of mercury switch 95. In addition, wire 108 is connected to the left-hand end of compensating resistance 94 by a wire 110 and to the left-hand end of the control resistance 83 by wire 110 and a wire 111. Electrical valve 62 additionally includes a controlling wire 112 which is connected to the right-hand end of compensating resistance 94 by a wire 113 and to the right-hand end of control resistance 83 by a wire 114.

The temperature differential responsive mechanism 70 is so arranged and adjusted that with the contact arm 82 at the right-hand end of control resistance 83 as shown in the figure, there is a temperature differential of 50 degrees between the temperature of the brine entering the sprays 50 and that leaving the contact plates 64. On the other hand, when this temperature differential drops down to 17 degrees, the contact arm 82 is in engagement with the extreme left-hand end of control resistance 83. The temperature responsive controller 71 has a range of 135° F. down to 80° F. When the temperature of the air leaving the concentrator is 135° F., the contact arm 92 is engaging the left-hand end of compensating resistance 94. If the temperature falls to 80° F., the contact arm 92 engages the right-hand end of compensating resistance 94, and at this time, the mercury switch 95 has its position reversed so that the circuit between the left-hand electrodes thereof is broken and the circuit between the right-hand electrodes thereof is closed.

With the parts in the position shown, the complete system is operating in that fan 22 is causing air to pass through the dehumidifying chamber 20, the recirculating fan 32 is recirculating the brine mist, the vacuum producing means 34 is producing a vacuum within the spray chamber 27, the pump 52 is pumping weak brine from the sump 30 to the spray 50, the electrical valves 53 and 57 are open, the pump 55 is taking the more concentrated solution from the sump 46 and recirculating some of it to the sprays 50 and returning the rest to the sprays 28 of the dehumidifying chamber 20, and the steam valve 62 is wide open. Also, the temperature differential between the brine entering the sprays 50 and leaving the contact plates 64 is 50 degrees. The parts are so arranged that under such conditions the actual brine temperature is about 180° and the quantity of air flowing through the concentrator is such that the leaving air temperature is 135°. It is obvious that in order for the air flowing through the chamber 45 to remove moisture from the weak brine solution, water must be evaporated therefrom. This requires heat and the giving up of heat by the brine heats the air to 135°. This giving up of heat by the hot brine results in the temperature differential of 50 degrees, aforementioned.

Let us now assume that the concentration of the brine becomes stronger, either due to the action of the brine concentrating chamber 45 or due to a reduction in load on the dehumidifying chamber 20 or by reason of the fact that the air passing through the brine concentrating chamber 45 becomes drier. Regardless of which condition causes the brine solution to become stronger, such increase of strength in the brine solution results in there being less water evaporated therefrom. As a result, less heat is being taken out of the brine coming from the sprays 50. It therefore follows that the temperature differential will become less. If this occurs, then the pressure in bellows 73 in respect to the pressure in bellows 74 will increase and arm 79 will rotate somewhat in a counter-clockwise direction thereby moving contact arm 82 away from the right-hand end of resistance 83. This decrease in the amount of water evaporated may likewise cause the leaving air temperature to increase but this can have no effect upon the control system since at 135° the contact arm 92 is at the extreme left-hand end of compensating resistance 94. Such movement of contact arm 82 away from the extreme right-hand end of control resistance 83 operates to close the valve 62 somewhat. This reduces the amount of heat applied to the brine being recirculated to the sprays 50 so that its temperature will not be so great. As a result, the temperature of the air leaving the concentrator will likewise drop and will drop below 135°. Such drop in temperature causes the contact arm 92 to move away from the left-hand end of compensating resistance 94 somewhat towards its right-hand end. The result of this action is to shift the control point of differential controller 70 to the left so that it now operates to maintain a temperature differential of less than 50 degrees. A balance of course will be struck under these new conditions wherein a newer and lesser differential is maintained between the brine being sprayed by the sprays 50 and the temperature of the brine leaving the contact plates 64 and wherein the temperature of the air leaving the concentrator will become constant but at a value less than 135°.

If the load on the system should become light enough, or if for any other reason the concentration of the brine should become strong enough, so little water will be evaporated that the differential controller 70 will be controlling at the extreme left-hand end of control resistance 83 or at a differential of 17 degrees. Also, the temperature of the air leaving the concentrator will drop to 80°, thereby requiring this low differential of the differential controller 70. When this occurs, mercury switch 95 will be tilted so as to break the connection between wires 98 and 99 and will instead connect wire 98 to wire 109 which is in turn connected to the valve controlling wire 106 by the wire 108. The steam valve 62 will therefore be completely closed.

In this manner, as the concentration of the brine solution increases, the temperature of the air leaving the concentrator is reduced and the differential in temperature between the entering and leaving brine is reduced and this in turn is caused to control the steam valve.

If the brine concentration should now become weaker, this means there is more water in the brine and more water will be evaporated. This requires more heat with the result that the temperature differential will widen. The differential controller 70 in trying to maintain its predetermined temperature differential will open the steam valve 62 more widely. This results in more heat being delivered to the brine going to the sprays 50 and the temperature of the air leaving the concentrator 45 will likewise increase. Compensator 71 will respond to this increase in temperature and move its arm 92 towards the left thereby shifting the control point of the differential controller 70 towards the right so that it tends to maintain a higher differential. This will continue until a balance is reached, or if the load on the system is too great, it will continue until the original conditions are restored wherein the temperature of the air leaving the concentrator is 135°, the temperature of the brine entering it is 180°, and the temperature of the brine going to the sump 46 is 130°, in other words a differential of 50 degrees.

Electrical control systems of the general type in which a modulating valve is controlled by a potentiometer controller, the control point of which is in turn shifted by the compensator, are not new per se. If more complete information as to the exact workings of such a control circuit or modulating valve is desired, reference may be had to Haines Patent 2,173,331 granted September 19, 1939, and particularly Figure 3 thereof, where such a modulating motor is controlled by a temperature responsive device, the control point of which is shifted in accordance with the relative humidity and outdoor temperature conditions so as to provide what is known in the air conditioning art as a compensated effective temperature control arrangement.

The complete system as thus far described lends itself very well to being controlled by the moisture content of the air in the space or room 25. To this end I have shown a potentiometer type relative humidity controller 120 in control of a modulating motor 121 which in turn variably positions a shaft 122 in accordance with changes in relative humidity.

The vacuum producing means 34 is controlled by a mercury switch 123 through a circuit as follows; line wire 124, wire 125, mercury switch 123, wire 126, vacuum producing means 34, and wire 127 to the other line wire 128. The mercury switch 123 is positioned by a cam 129 in turn operated by the shaft 122 of the modulating motor 121. With the parts in the position shown, the relative humidity is at the highest desired value and mercury switch 123 is closed. The system is therefore operating in the manner heretofore described.

Now, if the relative humidity should drop two per cent, the shaft 122 will rotate to such extent that the portion of cam 129 having the larger radius will completely pass under the mercury switch 123 and mercury switch 123 will open in a manner well known in the art. Therefore, upon a two per cent drop in humidity in the room or space, 25, the vacuum producing means 34 will have its operation discontinued. As a result, there is a smaller differential in pressure between the air being dehumidified and the spray chamber 27 so that less water molecules will pass through the molecular filter 26. The humidity of the air being delivered to the room or space 25 therefore will not be reduced to such a great extent.

The recirculating fan 32 for the brine mist is similarly controlled by a mercury switch 130 through a circuit comprising line wire 124, wire 131, mercury switch 130, wire 132, brine mist recirculating fan 32, and wire 133 to the other line wire 128. The mercury switch 130 is positioned by a cam 135. The shape of this cam is such that the mercury switch 130 remains closed until the relative humidity has dropped four per cent below the extreme value shown, or in other words two per cent below that value at which the vacuum producing means 34 has its operation discontinued. When the humidity has been lowered to this extent, the brine mist recirculating fan 32 is stopped so that the brine mist is no longer recirculated at high velocity. This again reduces the amount of moisture removed from the air being supplied to the room or space 25 since now the only moisture removed is due entirely to the difference in vapor pressure between the sprayed brine mist and the air to be dehumidified, without the helping action of the rapid velocity movement of the brine mist or the helping action of the vacuum producing means.

The solenoid valves 53 and 57 are controlled by a third mercury switch 136. The circuit for solenoid valve 53 is as follows: line wire 124, wire 137, mercury switch 136, wire 138, wire 139, solenoid valve 53, wire 140, and wire 141 to the other line 128. The circuit for solenoid valve 57 is as follows: line wire 124, wire 137, mercury switch 136, wire 138, wire 142, solenoid valve 57, wire 143, and wire 141 to the other line wire 128. The mercury switch 136 is positioned by a cam 144 also driven by the shaft 122 of the modulating motor 121. The shape of cam 144 is such that mercury switch 136 remains closed during high humidities and does not open until the humidity has dropped, say six per cent below the extreme value, or two per cent below that value at which brine recirculating fan 32 is turned off. When the relative humidity has been reduced to this extent, solenoid valves 53 and 56 close. Closing of solenoid valve 57 prevents the delivery of concentrated brine to brine sprays 28 in the dehumidifying chamber 20 and closure of the solenoid valve 53 stops circulation of weak brine solution from the sump of the dehumidifying apparatus to the sprays 50 of the brine concentrator.

The steam valve 62, in addition to being controlled by the apparatus heretofore described, is also controlled by the mercury switch 97. This mercury switch is controlled by a cam 145 operated by shaft 122 of the modulating motor 121. The construction and arrangement of cam 145 is such that it remains in the position shown during high humidity in the room or space 25 and does not move sufficiently to operate mercury switch 97 until such time as the solenoid valves 53 and 57 are closed. When this occurs, the position of mercury switch 97 is reversed. Breaking of the circuit of the left-hand electrodes of mercury switch 97 entirely disconnects common wire 96 from the differential controller 70 and the temperature controller 71. Closure of the right-hand terminals connects common wire 96 to wire 107 which in turn is connected to the valve controlling wire 106 with the result that the steam valve 62 is closed.

Since the solenoid valves 53 and 57 are now closed and since the steam valve 62 is likewise closed, there is no utility in maintaining the pumps 52 and 55 or the fan 48 in operation and all of these devices may now be deenergized. This can be simply accomplished by the mercury switch 136 or by providing additional switches in a manner that will be clear from the preceding description.

From the foregoing it will be clear that I have provided a novel system of dehumidification of the chemical type which is completely automatic in its operation, including the reconcentration of the hygroscopic solution used therein. Further, I have provided a novel reconcentrator and control system therefore which, while it has particular utility in my complete system, is also useful in other systems wherein it is desired to reconcentrate a weak solution. In addition I have provided a new method and means of removing water vapor from air without the air and removing agent coming in actual physical contact with each other.

It will be obvious that many changes can be made in the various portions of my invention as well as in the complete arrangement without departing from the fundamentals thereof and I therefore intend to be limited only by the scope of the claims appended hereto.

I claim as my invention:

1. In a solution concentrating apparatus, a concentrating chamber means including sprays and an air passage, the bottom of said chamber means serving to collect concentrated solution, conduit means for supplying weakened solution to said sprays, additional conduit means for recirculating concentrated solution from said chamber means to said sprays, flow control means for controlling the circulation of concentrated solution to said sprays, heater means for heating the recirculating concentrated solution, differential temperature responsive means having an element responsive to temperature of one of said solutions before it passes through said sprays and another element responsive to the temperature of said solution after it passes through said sprays, and means connecting said differential temperature responsive means in controlling relation to said heater means.

2. In a solution concentrating apparatus, a chamber wherein the solution is concentrated, sump means connected to said chamber means for collecting concentrated solution, conduit means for supplying weakened solution to said chamber, additional conduit means connected to said sump and to the first named conduit means for mixing concentrated solution with said weakened solution, and a pressure regulating means arranged in said additional conduit means and responsive to the pressure of the mixture.

3. In a solution concentrating apparatus, a chamber, spray means within said chamber, conduit means including a pump for forcing a solution to be concentrated to said spray means, surface contact means within said chamber for concentrating said solution, sump means for collecting the concentrated solution, and fluid circulating means connected to said sump and to said spray means for supplying sufficient concentrated solution to said spray means to maintain at least a predetermined pressure at said spray means.

4. A solution concentrating apparatus comprising a chamber, an air passage through said chamber, means for introducing liquid solution into said chamber, means within said chamber for exposing said solution to air passed through said passage, means for heating said solution prior to introducing it into said chamber, differential temperature responsive means having one element responsive to the temperature of the solution prior to its exposure to said air and having another element responsive to the temperature of said solution after it has been exposed to said air, means connecting said differential temperature responsive means in controlling relation to said solution heating means for controlling said heating means in a manner to maintain a predetermined temperature difference between said solution temperatures at said elements, and temperature responsive means responsive to the temperature of the air leaving said chamber connected to modify the control exercised by said differential temperature responsive means in a direction to reduce the differential temperature between said elements upon a reduction in said leaving air temperature.

5. A solution concentrating apparatus comprising, a chamber having an air passage therethrough, means for delivering a liquid into said chamber, means within said chamber for exposing said liquid to air passing through said passage, controllable means for heating said liquid prior to its exposure to said air, differential temperature responsive means having one element arranged to respond to the temperature of said liquid prior to its exposure to the air in said chamber and having another element arranged to respond to the temperature of said liquid after its exposure to said air, and means connecting said differential temperature responsive means in control of said heating means.

6. In a solution concentrating apparatus including a chamber having an air passage therethrough and sprays for spraying a solution into said air passage, conduit means connected to said sprays, said conduit means including a controllable heat exchange means; and control means for said apparatus comprising a differential thermostat means having one temperature responsive element arranged to respond to the temperature of the solution supplied to said sprays and another element responsive to the temperature of the solution after being sprayed into said passage, means connecting said thermostat means in controlling relation to said heat exchange means, and thermostatic means responsive to the temperature of air in said passage downstream from said sprays arranged to effectively adjust said differential thermostat means.

ROBERT B. P. CRAWFORD.

REFERENCES CITED

The following references are of record in the file of this patent:

UNITED STATES PATENTS

| Number | Name | Date |
|---|---|---|
| 2,085,028 | Kelley | June 29, 1937 |
| 2,095,386 | Hibberd | Oct. 12, 1937 |
| 2,135,512 | Holven | Nov. 8, 1938 |
| 2,173,331 | Haines | Sept. 19, 1939 |
| 2,273,804 | Newton | Feb. 17, 1942 |
| 2,290,465 | Crawford | July 21, 1942 |
| 2,304,150 | Crawford | Dec. 8, 1942 |